United States Patent [19]

Hotta

[11] 4,238,934
[45] Dec. 16, 1980

[54] CONSTANT TEMPERATURE BOX
[75] Inventor: Masashi Hotta, Osaka, Japan
[73] Assignee: Shimano Industrial Company, Limited, Osaka, Japan
[21] Appl. No.: 32,957
[22] Filed: Apr. 24, 1979
[30] Foreign Application Priority Data
Apr. 28, 1978 [JP] Japan .................... 53-57980
[51] Int. Cl.³ .................... F25D 3/08; F25D 3/10
[52] U.S. Cl. .................... 62/457; 62/371; 62/372; 62/529; 62/530
[58] Field of Search ............ 62/371, 372, 457, 529, 62/530

[56] References Cited
U.S. PATENT DOCUMENTS

| | | | |
|---|---|---|---|
| 2,239,128 | 4/1941 | Sykes | 62/457 X |
| 2,631,402 | 3/1953 | Lastofka | 62/371 X |
| 2,767,563 | 10/1956 | Picascia | 62/372 |
| 3,187,518 | 6/1965 | Bair et al. | 62/530 X |
| 3,255,607 | 6/1966 | Bair et al. | 62/530 X |
| 3,387,650 | 6/1968 | Hoffmann et al. | 62/457 |
| 3,406,532 | 10/1968 | Round et al. | 62/457 |
| 3,791,547 | 2/1974 | Branscum | 62/371 X |
| 4,050,264 | 9/1977 | Tanaka | 62/371 X |

Primary Examiner—Lloyd L. King
Attorney, Agent, or Firm—Stevens, Davis, Miller & Mosher

[57] ABSTRACT

A constant temperature box comprises a body and a lid for closing the body at an upper opening thereof, which are of adiabatic construction, and a container which is made flat and small in height and supported horizontally at the upper portion of the body the container serving as a cooling or heating source to cool or warm the content of the box.

3 Claims, 4 Drawing Figures

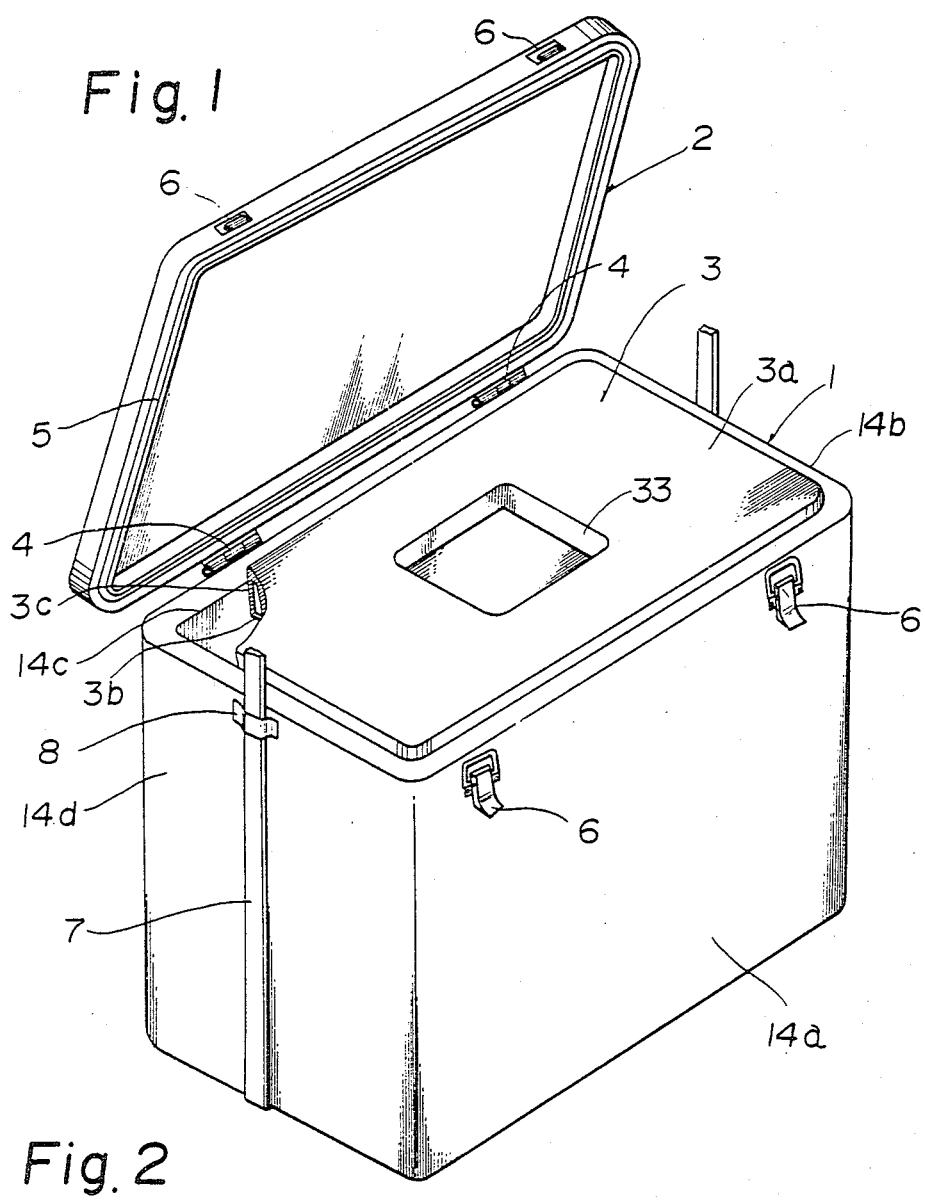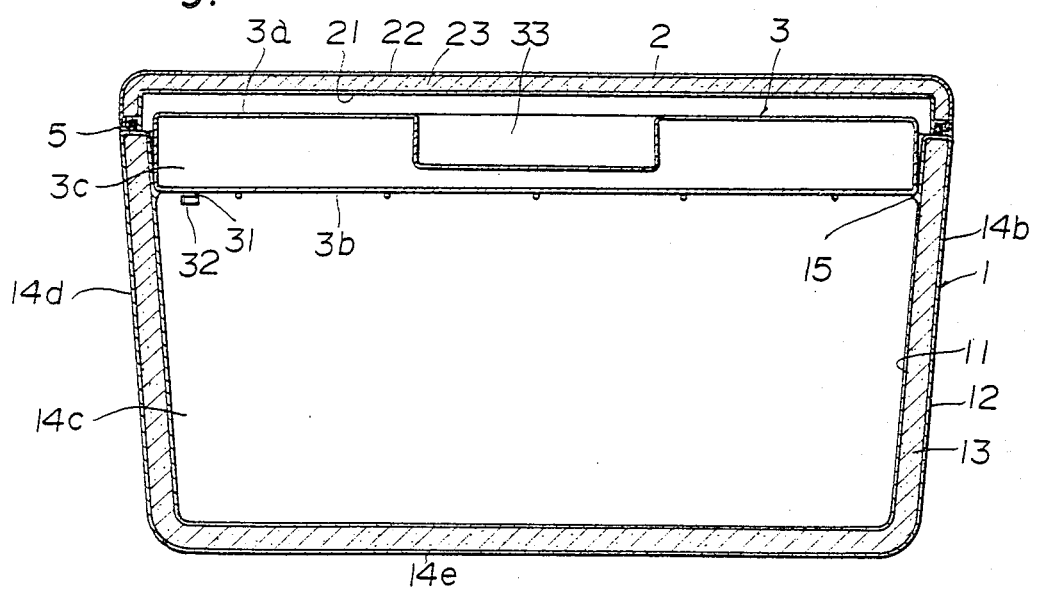

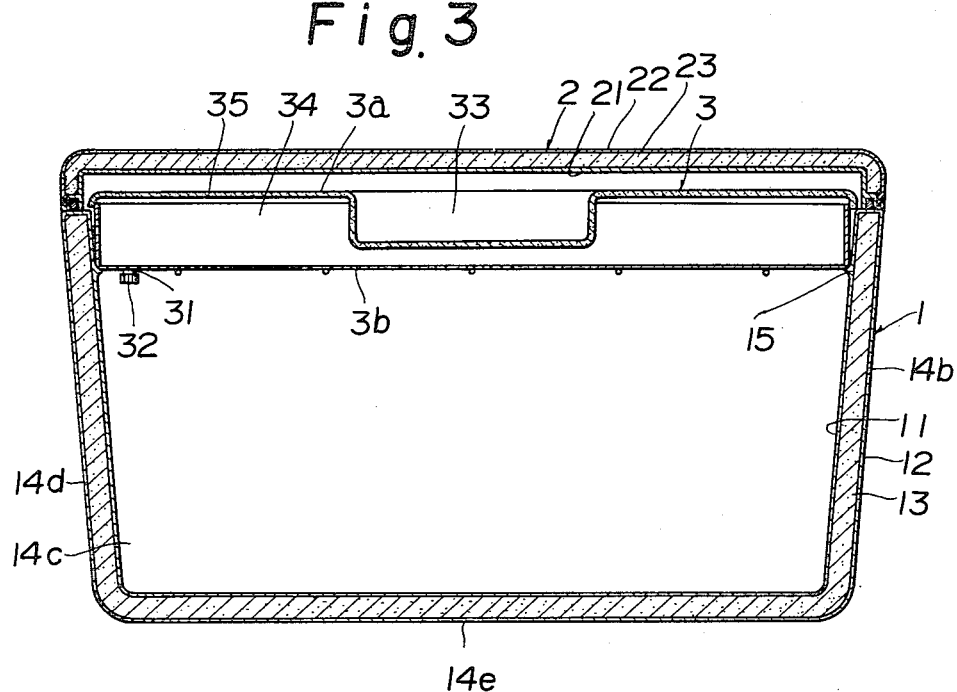
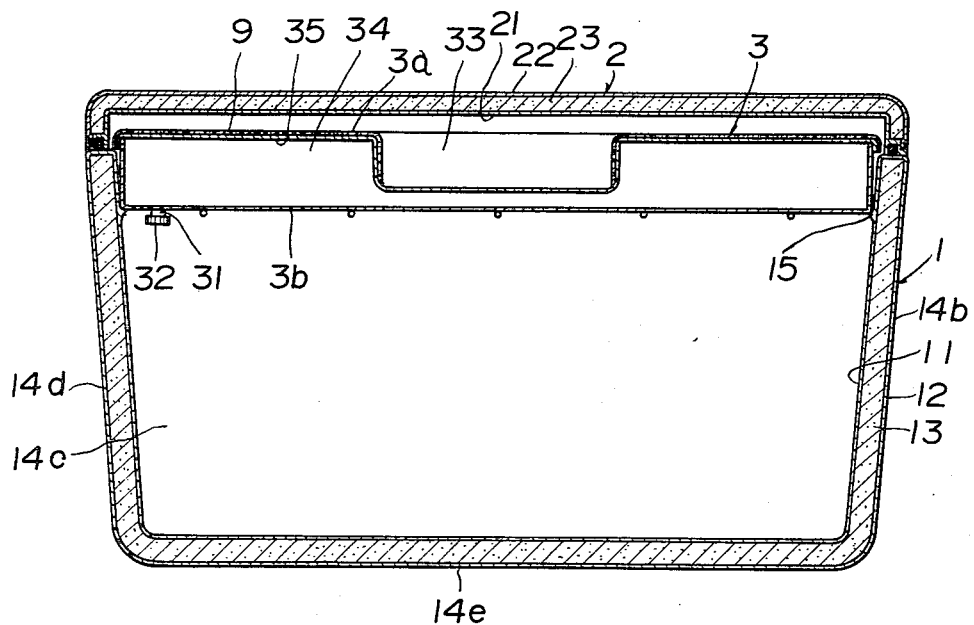

CONSTANT TEMPERATURE BOX

This invention relates to a constant temperature box which includes a cooling or heating source for keeping the interior of the box cool or warm at a constant temperature, so that its contents such as foodstuffs and beverages, may be kept cool or warm as required.

Conventionally, a cooler and a constant temperature container are well-known. The cooler keeps its interior at a low temperature to cool the contents thereof and the constant temperature container, typically constructed as a jar having an adiabatic construction with two glass walls and a vacuum therebetween, also keeps cool or warm the contents thereof.

The cooler is constructed of a body and a lid which are formed of heat insulating material, the lid closing the body to keep the interior thereof airtight. Foodstuffs and beverages together with ice are stored in the cooler with the foodstuffs and beverages being cooled by the ice which serves as a cooling source.

In this cooler constructed as decribed, the ice eventually melts, collects as water at the bottom of cooler, and contacts with the foodstuffs, causing undesirable discoloration or degeneration thereof.

The constant temperature container is superior in adiabatic effect compared with the cooler and can keep its contents cool or warm for a long time period. The container, however, has a complicated construction and is expensive, particularly if made in a large size for storing of significant amounts of foodstuffs and beverages, and has the further defect of using breakable glass walls.

This invention has been designed to overcome the problems associated with conventional coolers and constant temperature containers. An object of the invention is the provision of a constant temperature box simple in construction, inexpensive to produce, unbreakable even with rough handling, and capable of positively cooling or warming the foodstuffs and beverages within the box without detrimentally influencing the quality thereof, thereby keeping them at constant temperature for a long time.

The constant temperature box of the invention comprises a body and a lid closing an upper opening thereof, the body and lid being of adiabatic construction. The box is incorporated with a container which serves as a cooling or heating source and which is formed flat and small in height to be disposed horizontally at the upper portion of the body, thereby cooling or warming foodstuffs and beverages kept within the box.

The cooling or heating source container is made hollow, flat and small in height, and closes tightly to retain a liquid therein which forms the cooling or heating medium. At a wall of the container are provided an intake for the liquid and a stopper closing the intake.

The container also is formed of a material, such as a synthetic resin or an aluminum alloy, having the properties of heat-resistance and heat-transferability. The liquid heating or cooling mediums in the container are usually water. The container, when using water as the cooling medium, is filled with water through the intake and closed by the stopper and then put into a refrigerator to freeze the water. Water may also be preheated to a high temperature and placed within the container through the intake, thereby being used as a heating medium.

The container, which is disposed horizontally at the upper portion of the cooled or heated box, allows cold or warm air to circulate by convection from the liquid, thereby keeping the interior of box as a whole at low or high temperature to cool or warm all the contents throughly. Furthermore, the container is nearly equal in size to the upper opening of the body and fits thereto to tightly close the interior of body. The container also has at its upper wall a recess which receives frequently used small aticles, such as fishing bait, and keeps them cool or warm.

These and other objects, features and advantages of the invention will become more apparent upon a reading of the following detailed specification in connection with the accompanying drawings, in which:

FIG. 1 is a perspective view of a first embodiment of the invention, showing a lid opened, FIG. 2 is a longitudinally sectional view of the embodiment in FIG. 1, showing the lid closed, and FIGS. 3 and 4 are longitudinally sectional views of a second and a third embodiment of the invention respectively.

A constant temperature box of the invention, as shown in FIG. 1, comprises a body 1 opening upwardly and having an inner space for receiving foodstuffs and beverages therein, a lid 2 for closing the upper opening of body 1, and a container 3 fit to the upper portion of the body and serving as a cooling or heating source.

The body 1 is composed of an inner body 11 of stainless steel, an outer body 12 of synthetic resin, and insulating material 13 of polyurethane or foaming sterol resin inserted between the inner and outer bodies 11 and 12. The body 1 has four side walls 14a to 14d and a bottom wall 14e and opens upwardly.

The lid 2 has a shallow dish-like shape and, similarly to the body 1, comprises an inner and an outer body 21 and 22 of synthetic resin and insulating material 23 inserted therebetween, and is supported to the upper edge of one side wall 14c of the body 1 by means of hinges 4 to permit free opening and closing of the lid. The lid 2 also is surrounded at the edge thereof by packing 5 through which the body 1, when the lid 2 is closed, is hermetically sealed.

Between the body 1 and the lid 2 are provided clasps 6 to tightly and securely hold the lid 2 against the body. At the body 1 are provided holders 8 for a band 7 which is inserted therethrough, the band 7 being used for carrying the box.

The container 3 is formed to be hollow, flat and small in height and has an inner space for receiving a liquid which serves as the cooling or heating medium. The container 3 is nearly equal in length to each of the opposite side walls 14a and 14c, nearly equal in width to each of the opposite walls 14b and 14d, and small in height to form as a whole a flat hexahedron. At a bottom wall 3b of the container 3 are provided an intake 31 and a stopper 32 therefor. The container 3 also is formed of material, such as synthetic resin or aluminum, having the properties of heat-resistance and heat-transferability.

The container 3 can be filled with water through the intake 31 and put into, for example, a domestic refrigerator for freezing and thereafter be used as the cooling source. On the other hand, the water can be preheated to a high temperature poured into the container 3 through the intake 31 and thereafter the container can be used as the heating source.

The container 3 is fit to the body 1 horizontally at the upper portions of side walls 14a to 14d of the body 1 by means of support means to be hereinafter described.

The support means mainly comprises projections 15 provided at at least one pair of opposite side walls 14a and 14c or 14b and 14d. In FIGS. 1 and 2, a plurality of projections 15 are provided at the four side walls 14a to 14d respectively.

The projections 15 may be elongated horizontally at the side walls 14a to 14d. In place of the projections 15, the side walls 14a to 14d may be slant downwardly inwardly of the body 1 as shown in FIG. 2. In this instance, four side walls 3c of container 3 are preferable slant, rather than perpendicular, to meet the slant side walls 14a to 14d at the body 1 so that the bottom wall 3b of container 3 is slightly smaller in size than the upper opening of the body 1, whereby the container 3, when fit into the body 1 and supported thereto, is in close contact at the side walls 3c with the upper portions of side walls 14a to 14d respectively. By this, the interior of the body 1 is closed tight by the container 3 to preserve the cold or heat within the box for a long time.

It is preferable to form at the upper wall 3a at the container 3 a recess 33 for receiving small articles, such as live bait, fish-hooks and sinkers, or chocolates and candies.

The upper wall 3a, when provided with the recess 33, may be of adiabatic construction by attaching insulating material, such as synthetic resin, especially foaming synthetic resin. As an alternative construction the container 3 may, as show in FIG. 3, be divided vertically into the upper and lower portions 35 and 34, the lower portion 35 being formed of material, such as aluminum alloy, having the property of heat-transferability. The detachably coupled with the upper portion 35, the upper portion 35 being formed having a synthetic resin of heat-resistance to form the upper wall 3a of adiabatic construction. In this instance, the contents of recess 33 formed of the upper wall 3a of adiabatic construction are not thermally affected by the cooling or heating liquid.

In the FIG. 3 arrangement, the upper portion 35 may be formed of aluminum alloy having the property of heat-transferability similarly to the lower portion 34 and the upper wall 3a except for the recess 33 may be attached with insulating material 9 as shown in FIG. 4. By this, cold or warm air circulating from the cooled or heated liquid cooling or heating source within the container 3, can cool or warm the small articles in the recess 33 through the bottom thereof which is made of heat-transferable material.

The container 3 of the invention, when used as a cooling source, is filled with water and put into a domestic freezer so as to freeze the water. When the container is a used as heating source, the container 3 is filled with preheated hot water. In either case, the container 3 is then fit into the body 1 and supported horizontally at the upper portion thereof by means the projections 15, whereby the interior of box is cooled or warmed through the container 3 to keep the contents constantly at a low or high temperature. The recess 33 at the upper wall 3a of container 3, when the upper wall 3a is not of adiabatic construction or at least when the bottom of recess 33 has a heat-transferable property, can receive live bait for fishing, chocolate and candies to be cooled, or other small articles which are to be warmed or cooled. On the other hand, the recess 33, when formed in an upper wall 3a of adiabatic construction, can receive small articles which need not to be cooled or warmed.

As clearly understood from the aforesaid description, the constant temperature box of the invention is provided with a container which is used as a cooling source when filled with frozen water or as a heating source when filled with hot water and which is supported horizontally at the upper portion of the box, so that the interior thereof may selectively be cooled or warmed and the contents therein may positively be cooled or warmed without causing discoloration or degeneration. The constant temperature box also can keep its interior as a whole cold or warm by convection of cold or warm air, thereby improving to a great extent the cooling or heating effect. In other words, convection is naturally produced within the body to thereby cool or warm the contents uniformly.

Furthermore, the horizontally supported container has a recess formed at the upper wall of the same, so that small articles in frequent use may be put into the recess and cooled or warmed by the liquid filed in the container as the cooling or heating source.

As many apparently widely different embodiments of this invention may be made without departing from the spirit or scope thereof, it is to be understood that the invention is not limited to the specific embodiments thereof disclosed but only as defined in the appended claims.

What is claimed is:

1. A portable constant temperature box for cooling or warming the box contents at a constant temperature, comprising:
    (a) a body defining an inner space for receiving objects to be kept warm or cold, said body having an upper opening and comprising side walls and a bottom wall which are of adiabatic constructions,
    (b) a lid of adiabatic construction pivoted to the upper portion of said body to open or close said upper opening,
    (c) means for tightly closing said upper opening with said lid,
    (d) a container forming a cooling or heating source supported horizontally at an uppermost portion of said body, said container projecting upwardly from the uppermost portion of said box body and comprising an airtight, flat, hollow container having a small height for receiving liquid serving as the cooling or heating medium and a liquid intake and a stopper for closing said intake, said container having at an upper wall thereof a recess for receiving small articles and an upper wall of adiabatic construction except for a portion thereof which forms at least the bottom of said recess, said portion having a heat-transferable construction; and
    (e) support means for horizontally supporting said container at an uppermost portion of said body.

2. A constant temperature box according to claim 1 wherein said support means comprises projections formed on at least two oppositely disposed sidewalls of said body.

3. A constant temperature box according to claim 1 wherein said container has sidewalls which abut the sidewalls of said body, the sidewalls of said body slanting inward of the body interior near said upper opening and the sidewalls of said container slanting in complementary manner to the sidewalls of said body.

* * * * *